(12) United States Patent
Arnett et al.

(10) Patent No.: US 10,549,376 B2
(45) Date of Patent: Feb. 4, 2020

(54) WELDING POSITIONING TOOL WITH INTERNAL GAS PORTS

(71) Applicant: The Boeing Company, Chicago, IL (US)

(72) Inventors: Shawn M. Arnett, Auburn, WA (US); Mark E. McGeary, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 413 days.

(21) Appl. No.: 15/333,006

(22) Filed: Oct. 24, 2016

(65) Prior Publication Data

US 2018/0111233 A1    Apr. 26, 2018

(51) Int. Cl.
*B23K 9/00* (2006.01)
*B23K 9/32* (2006.01)
*B23K 9/167* (2006.01)

(52) U.S. Cl.
CPC .............. *B23K 9/326* (2013.01); *B23K 9/167* (2013.01)

(58) Field of Classification Search
CPC .... B23K 9/326; B23K 9/325; B23K 37/0531; B23K 2101/06; B23K 2101/10; B23K 31/027; B23K 37/0435; B23K 37/0282
See application file for complete search history.

(56) References Cited

U.S. PATENT DOCUMENTS

| 4,723,064 A | 2/1988 | Bothe, II |
| 2016/0074955 A1* | 3/2016 | Evans ................... B23K 9/326 228/219 |

* cited by examiner

*Primary Examiner* — Erin B Saad
(74) *Attorney, Agent, or Firm* — Haynes and Boone, LLP

(57) ABSTRACT

Systems and methods are provided for a boss welding positioning tool. The boss welding positioning tool may, at least, include a purge base, a purge gas delivery connector, and features for aligning two items to be welded together. The purge gas delivery connector may be configured to be coupled to the purge base and may include ports that receive purge gas and deliver purge gas to an inner portion of the items to be welded.

20 Claims, 8 Drawing Sheets

WELDING POSITIONING TOOL WITH INTERNAL GAS PORTS

TECHNICAL FIELD

The disclosure relates generally to welding and more particularly to tools for improving welding alignment and quality.

BACKGROUND

Certain types of welding, such as Tungsten Inert Gas (TIG) welding, benefit from close alignment of items being welded as well as a pure welding environment. Such a pure welding environment may be, for example, an environment of inert gas, which may prevent oxidation of welds.

In certain types of welding, such as in TIG welding, purge gas may be delivered to an outside and/or inside surface of, at least, the area being welded. In certain types of welding, insufficient delivery of purge gas may result in weak, faulty, and/or oxidized welds that may be susceptible to breaking. In certain examples, purge gas may be delivered to the outside surface by, for example, blowing of purge gas to the outside surface (e.g., through a hose and/or other tool that may be positioned to deliver gas; such tools may, for example, be a part of the actual welding tool).

However, in certain such examples, delivering purge gas to the inside (e.g., interior) surface may require complicated setup and equipment as the interior surface may be hard to reach. Typical welding equipment does not include items to deliver purge gas to the inside surface. As such, complicated systems of seals and hoses may be required to provide and fill the entire interior in order to have an environment suitable for welding. Such seals and hoses may require large amounts of setup time, additional equipment, and may complicate the welding process and thus reduce throughput, increase costs, and decrease weld quality. Additionally, in certain examples, an item may need to be welded across an entire perimeter. With conventional welding techniques, such items may need to be flipped to be fully welded, further increasing production time and cost.

SUMMARY

Systems and methods are disclosed herein for a boss welding positioning tool. In certain examples, a tool for delivering purge gas to an internal portion of an intersection of a boss and a duct for welding the boss to the duct may be disclosed. The tool may include a purge base configured to be disposed within an inner portion of a duct and a purge gas delivery connector including a purge gas inlet port and a purge gas outlet port, and configured to couple to the purge base, receive purge gas with the purge gas inlet port, and exhaust the purge gas through the purge gas outlet port to the internal portion.

In certain other examples, a method may be disclosed. The method may include disposing a purge base within an inner portion of a duct, coupling a purge gas delivery connector into the purge base, where the purge gas delivery connector comprises a purge gas inlet port and a purge gas outlet port, coupling a boss alignment member to the purge gas delivery connector to hold a boss against the duct, coupling the purge gas inlet port to a purge gas source, flowing a purge gas from the purge gas source into the purge gas inlet to exit through the purge gas outlet port to the inner portion of the duct, providing a purge gas to an outer portion of the duct, and welding the boss to the duct.

In certain additional examples, a boss welding positioning tool for delivering purge gas to an internal portion of an intersection of a boss and a duct for welding the boss to the duct may be disclosed. The tool may include a purge base configured to be disposed within an inner portion of a duct, a purge gas delivery connector including a first connector end configured to be coupled to the purge base, a second connector end comprising a purge gas inlet, and a purge gas outlet port, where the purge gas inlet is configured to receive purge gas and the purge gas outlet port is configured to exhaust the purge gas to the internal portion, and a boss alignment member configured to couple to the purge gas delivery connector to hold at least a portion of the duct and the boss between the boss alignment member and the purge base.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Systems and techniques for welding a boss to a duct with a boss welding positioning tool may be disclosed herein. In certain examples, the boss welding positioning tool may include, at least, a purge base and a purge gas delivery connector. The purge base may be configured to be disposed within an inner portion of a duct to be welded. The purge gas delivery connector may couple to the purge base. In certain examples, the purge gas delivery connector may include, at least, a purge gas inlet port, a purge gas outlet port, and a purge gas flow path connecting the purge gas inlet port and the purge gas outlet port. Purge gas may enter through the purge gas inlet port, flow through the purge gas flow path, and exit through the purge gas outlet port to provide purge gas to an interior portion of the duct. Additionally, in certain examples, the tool may also include a boss alignment member that may be coupled to a boss that will be welded to the duct. The boss alignment member may aid in positioning the boss relative to the duct.

Figure 1A:
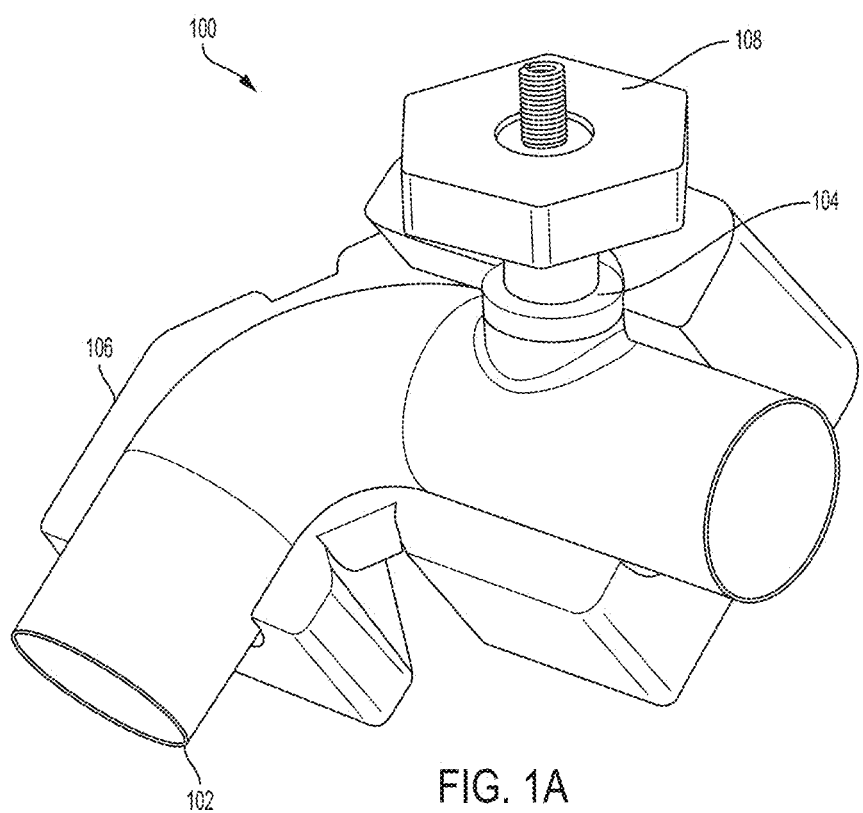
FIG. 1A illustrates a perspective view of a welding fixture with a boss welding positioning tool in accordance with an example of the disclosure.

FIG. 1A illustrates a perspective view of a welding fixture with a boss welding positioning tool in accordance with an example of the disclosure. The welding fixture 100 of FIG. 1 may include a duct 102, a boss 104, a holder 106, and a boss welding positioning tool 108. The duct 102 may be in the process of being welded to the boss 104 and/or being prepared to be welded to the boss 104. The holder 106 may hold the duct 102 and/or the boss 104 in a position for welding.

The boss welding positioning tool 108 may hold the duct 102 to the boss 104 (e.g., in a position that may substantially minimize any gaps present in the fitment of the duct 102 to the boss 104) to aid in welding the duct 102 to the boss 104. The boss welding positioning tool 108 may position the boss 104 relative to the duct 102. In certain examples, the boss welding positioning tool 108 may be configured to minimize production tolerances and thus improve quality. Additionally, the boss welding positioning tool 108 may be configured to deliver purge gas to an interior portion of the duct 102.

In certain examples, such as in TIG welding, purge gas, such as an inert gas, may be delivered to an outside and/or inside surface of, at least, a portion of the duct 102 and/or the boss 104 to be welded. The purge gas may prevent oxidation of the areas being welded. In certain examples, purge gas may be delivered to the outside surface by, for example, blowing of purge gas to the surface (e.g., through a hose and/or other tool that may be positioned to deliver gas; such tools may, for example, be a part of the actual welding tool). However, in certain such examples, delivering purge gas to the inside (e.g., interior) surface may require complicated setup and equipment as gas may need to be delivered through one of the two ends of the duct 102. As positioning such hoses within the duct 102 may be impractical, the ends of the duct 102 may be required to be capped off in order to maintain an environment of inert gas within the duct 102 that may prevent oxidation during welding. As such, waiting time may be required to allow the purge gas to fully fill the inside of the duct 102. Such configurations may require additional setup time, additional equipment, and may complicate the welding process and thus reduce throughput, increase costs, and decrease weld quality. By contrast, the boss welding positioning tool 108 may be configured to be set up quickly and accurately deliver purge gas to interior portion of the duct 102 and the boss 104 that is being welded together. In certain examples, the boss welding positioning tool 108 may allow accurate delivery of purge gas to the area being welded.

Figure 1B:
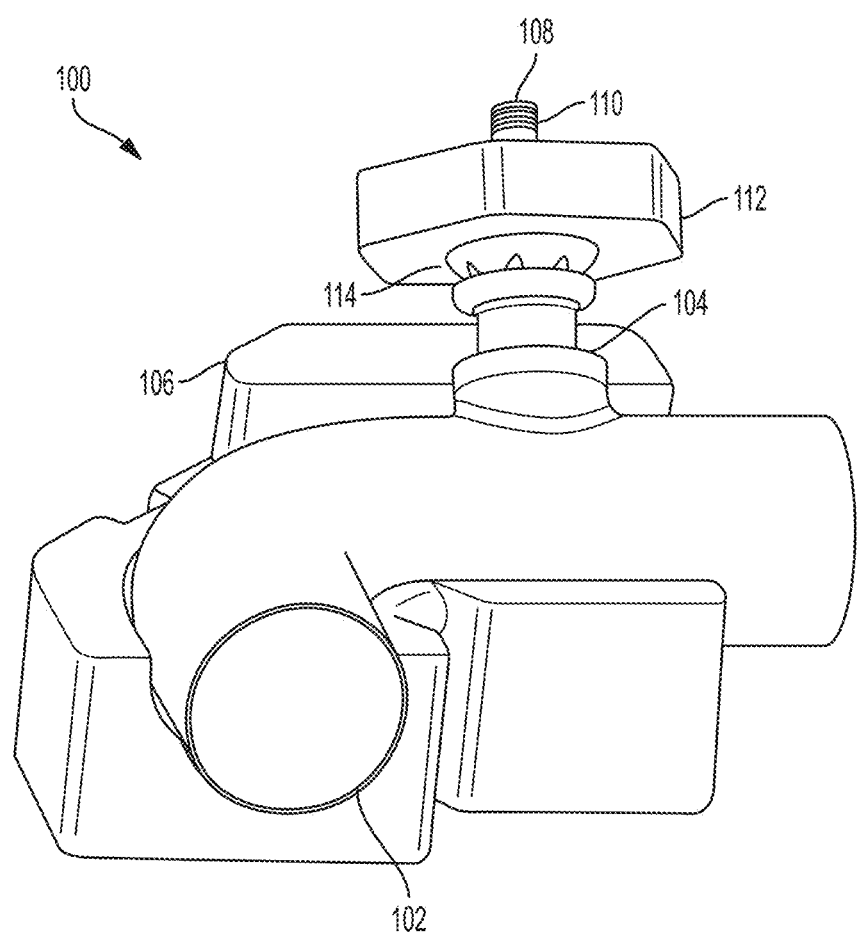
FIG. 1B illustrates another perspective view of the welding fixture with the boss welding positioning tool in accordance with an example of the disclosure.

FIG. 1B illustrates another perspective view of the welding fixture with the boss welding positioning tool in accordance with an example of the disclosure. FIG. 1B illustrates the welding fixture 100 of FIG. 1A. However, FIG. 1B may illustrate various components of the boss welding positioning tool 108, including a purge gas delivery connector 110, a nut driver 112, and a cone portion 114. In certain examples, the nut driver 112 may be configured to be coupled to a weld positioner. When coupled to the weld positioner, the nut driver 112 and, thus, the boss welding positioning tool 108, may be held in a substantially fixed position. The cone portion 114 may position and hold the boss 104 against the duct 102. The purge gas delivery connector 110 may be configured to be coupled to a purge gas source (e.g., a purge gas source from the weld positioner). The purge gas delivery connector 110 may thus receive purge gas from the purge gas source to deliver purge gas to the interior of the duct 102 and/or the boss 104. Such components may be further detailed in FIGS. 3 to 4C.

Figure 2:
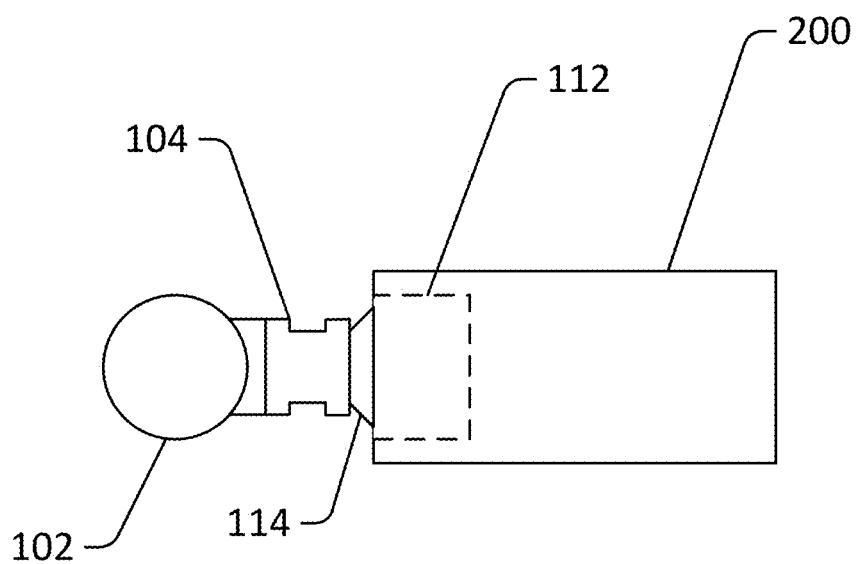
FIG. 2 illustrates a side cutaway view of a boss welding positioning tool coupled to a weld positioner in accordance with an example of the disclosure.

FIG. 2 illustrates a side cutaway view of a boss welding positioning tool coupled to a weld positioner in accordance with an example of the disclosure. FIG. 2 may include a weld positioner 200, the duct 102, the boss 104, the nut driver 112, and the cone portion 114.

The weld positioner 200 may include one or more of a cavity, a receiver, a magnetic mount, a form (e.g., hexagonal form configured to receive a corresponding feature of the boss welding positioning tool 108), a fastening system, and/or other such component that may be configured to receive the nut driver 112 and/or another corresponding feature of the boss welding positioning tool 108 to couple the weld positioner 200 to the nut driver 112 and/or another portion of the boss welding positioning tool 108. For example, the weld positioner 200 may include a hexagonal shaped cavity that may be configured to receive a hexagonal shaped nut driver 112. After the hexagonal shaped nut driver 112 is received in the hexagonal shaped cavity, the nut driver 112 (and thus, the boss welding positioning tool 108) may be substantially locked in place and may move responsive to movement of the weld positioner 200 and/or a portion of the weld positioner 200 that the boss welding positioning tool 108 is coupled to. In certain other examples, the boss welding positioning tool 108 may be coupled to the weld positioner 200 through other techniques (e.g., through nuts and bolts, adhesives, locking features, features that may be moved to lock the boss welding positioning tool 108 into place, and/or other such techniques).

In certain examples, the weld positioner 200 may be configured to allow rotation, translation, and/or other movement of a portion of the weld positioner 200 coupled to the boss welding positioning tool 108. In such examples, the weld positioner 200 may allow such movement of the boss welding positioning tool 108 to, for example, aid in welding of the duct 102 to the boss 104. For example, a first portion of the duct 102 and the boss 104 may be welded together, the weld positioner 200 may then be rotated to expose a second portion of the duct 102 and the boss 104, and the second portion may then accordingly be welded together.

Figure 3:
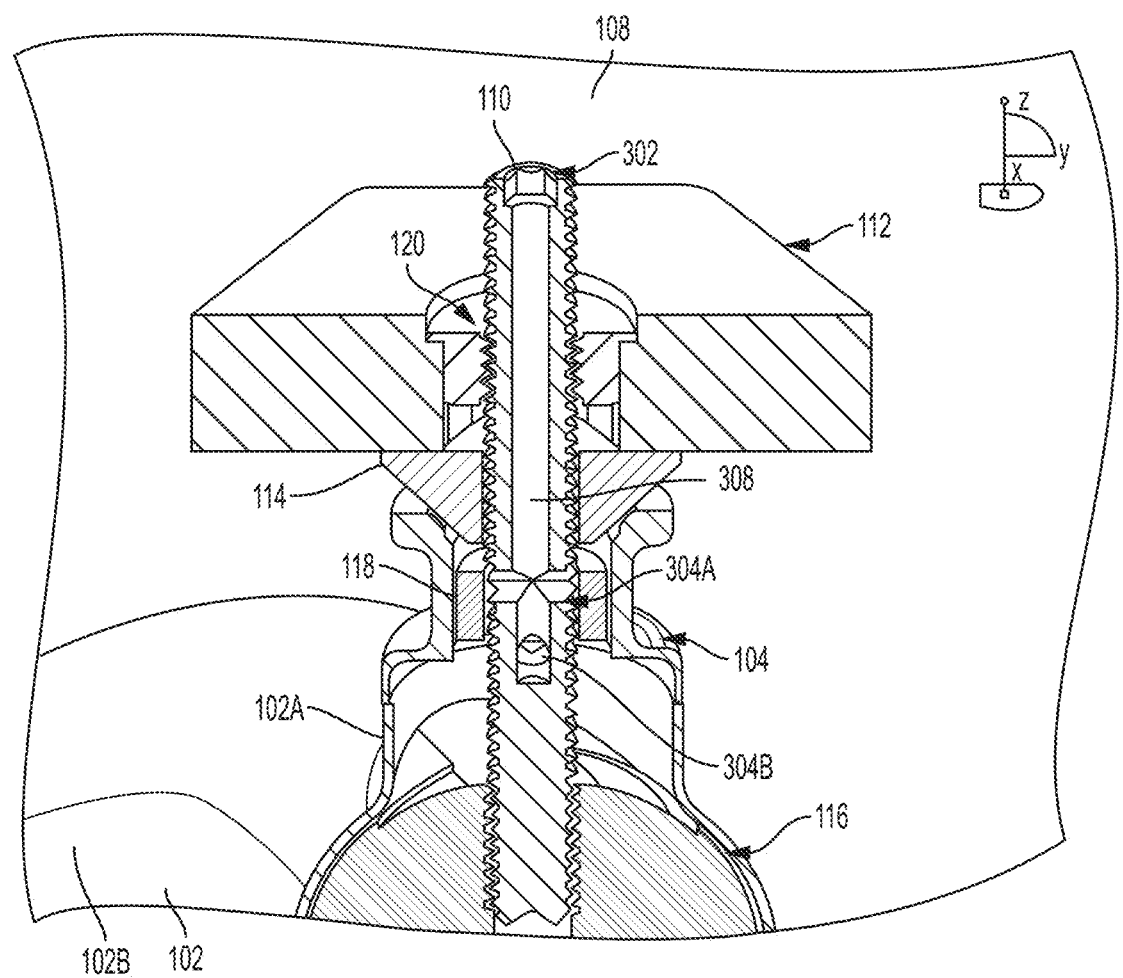
FIG. 3 illustrates a cutaway view of a boss welding positioning tool in accordance with an example of the disclosure.

FIG. 3 illustrates a cutaway view of a boss welding positioning tool in accordance with an example of the disclosure. FIG. 3 may illustrate the duct 102, the boss 104, and the boss welding positioning tool 108.

The duct 102 may include an opening portion 102A and a main duct body 102B. In certain examples, the main duct body 102B may be substantially cylindrically shaped and/or another shape. The main duct body 102B may include one or more bends. The opening portion 102A may be extruded and/or formed from a portion of the main duct body 102B. The opening portion 102A may include an opening. The opening may be sized and/or configured (e.g., may include forms) to receive the boss 104. For example, the opening may include a lip and/or ridge for the boss 104 to rest on. In certain examples, an outside diameter of the opening portion 102A and an outside diameter of the boss 104 may be substantially similar (e.g., within less than +/−0.5 inches, such as within 0.05 inches). Additionally, the geometry (e.g., cut lines) of the opening portion 102A may be configured to correspond to features of the boss 104 and, thus, minimize gaps when the boss 104 is fitted to the opening portion 102A, to aid in weld quality.

The boss welding positioning tool 108 may include the purge gas delivery connector 110, the nut driver 112, the cone portion 114, a purge base 116, a stop spacer 118, and a flange nut 120. Certain components of the boss welding positioning tool 108 may be configured to be coupled to and/or connected to one or more of the duct 102 and/or the boss 104 to hold the duct 102 to the boss 104 and/or to deliver purge gas to, at least, the portion of the duct 102 and the boss 104 that is to be welded.

The purge base 116 may, in certain examples, be shaped to conform to at least an interior portion of the duct 102 (e.g., may include at least a partially circular form to substantially conform to an inner circumference of a cylindrical shaped duct). The purge base 116 may include a threaded portion (e.g., a portion with male or female threads) that may be configured to receive the purge gas delivery connector 110. In other examples, the purge base 116 may include additional and/or alternative features that may couple to a purge gas delivery connector (e.g., magnets, snaps, friction fits, additional fasteners, and/or other such features). The purge base 116 may be configured to be disposed within the duct 102 and, in certain examples, the at least partially circular form may be moved to at least partially contact the inner circumference of the duct 102. After the purge base 116 has been positioned, the purge gas delivery connector 110 may be coupled to the purge base 116 (e.g., threaded into the purge base 116).

The purge gas delivery connector 110 may include a first end and a second end. The first end may be configured to receive purge gas from a purge gas source. The second end may be configured to be threaded into the purge base 116. The first end may include a purge gas inlet port 302. The purge gas inlet port 302 may be configured to couple to a purge gas source and receive a purge gas from the purge gas source. The purge gas may be any appropriate purge gas for welding, such as any inert gas. In certain examples, the purge gas inlet port 302 may include features such as forms, threads, keying features, pins, and/or other such features to couple to the purge gas source. Certain examples may include a plurality of purge gas inlet ports.

Purge gas may enter the purge gas inlet port 302 and may flow through flow path 308. In certain examples, the flow path 308 may be internal to the purge gas delivery connector 110. The flow path 308 may fluidically connect the purge gas inlet port 302 to one or more purge gas outlet ports (e.g., purge gas outlet ports 304A and 304B). In certain examples, the purge gas outlet ports 304A, 304B, and/or other purge gas outlet ports may be configured to deliver at least a portion of the purge gas flowing through the flow path 308 to an area of the duct 102 and the boss 104 being welded together. The purge gas outlet ports may be one or more openings on the purge gas delivery connector 110 that may allow gas within the flow path 308 to flow out to an environment outside of the purge gas delivery connector 110. In certain examples, the purge gas outlet ports may be configured to be disposed close to one or more areas that will be welded. For example, at least one or more of the purge gas outlet port may be disposed within less than 0.5 inches of the intersection of the duct 102 and the boss 104. In certain examples with a plurality of purge gas outlet ports, at least one purge gas outlet port may be disposed within less than 0.5 inches above the intersection and at least another purge gas outlet port may be disposed within less than 0.5 inches below the intersection of the duct 102 and the boss 104. Such a configuration may allow purge gas to more fully cover the intersection of the duct 102 and the boss 104 that is being welded. In certain such examples, a plurality of purge gas outlet ports may be disposed within around, for example, a perimeter of the purge gas delivery connector 110 to, for example, deliver purge gas within a 360 degree and/or other angle volume around the purge gas delivery connector 110.

In certain examples, the stop spacer 118 may position and/or aid in positioning the boss welding positioning tool 108 relative to the duct 102 (e.g., the opening portion 102A) and/or the boss 104. The stop spacer 118 may, for example, be configured to be disposed within a portion of the boss 104 and/or the duct 102. In certain examples, at least a portion of the stop spacer 118 may, for example, be configured to be disposed within 1 inch or less of the intersection of the duct 102 and the boss 104 to aid in the positioning of the purge gas delivery connector 110 to the duct 102 and/or the boss 104.

The boss welding positioning tool 108 may additionally include a boss alignment member. The boss alignment member may include one or more components, including the cone portion 114, the nut driver 112, and/or the flange nut 120.

The cone portion 114 may be coupled to the boss 104. At least a portion of the cone portion 114 may be cone shaped, substantially cone shaped, and/or may include other features that may aid in aligning the position of the boss 104 to the duct 102 for welding. For example, such features may control a position of the boss 104 relative to the duct 102. In the example shown in FIG. 3, the cone shaped portion may fix a position of the boss 104 relative to the purge base 116 and, thus, the duct 102 when a force is applied to couple and/or connect the cone portion 114 to the boss 104.

The flange nut 120 may, in certain examples, be threaded onto and/or otherwise coupled to the purge gas delivery connector 110. The flange nut 120 may be configured to hold or help hold the cone portion 114 against the boss 104 and, thus, position the boss 104 relative to the duct 102. The flange nut 120 may also hold the nut driver 112 (e.g., against the cone portion 114). In certain examples, the flange nut 120 may be coupled to the nut driver 112, and turning of the nut driver 112 may also turn the flange nut 120. In other examples, the flange nut 120 may be configured to be threaded against the nut driver 112.

Figure 4A:
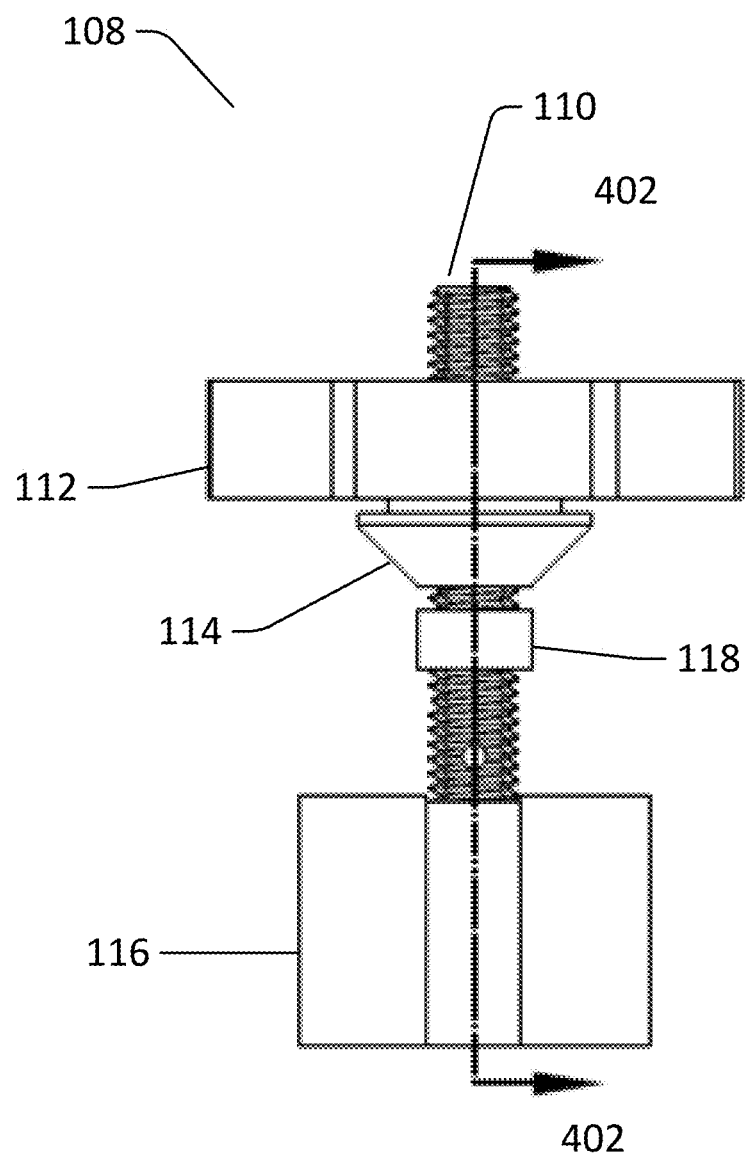
FIG. 4A illustrates a side view of a boss welding positioning tool in accordance with an example of the disclosure.

FIG. 4A illustrates a side view of a boss welding positioning tool in accordance with an example of the disclosure. The boss welding positioning tool 108 may include the purge gas delivery connector 110, the nut driver 112, the cone portion 114, the purge base 116, and the stop spacer 118, as well as the flange nut 120 (not shown) as described herein. The purge gas delivery connector 110 may be configured to be threaded into the purge base 116 around axis 402. The stop spacer 118 may be positioned so that it does not block one or more purge gas outlet ports.

Figure 4B:
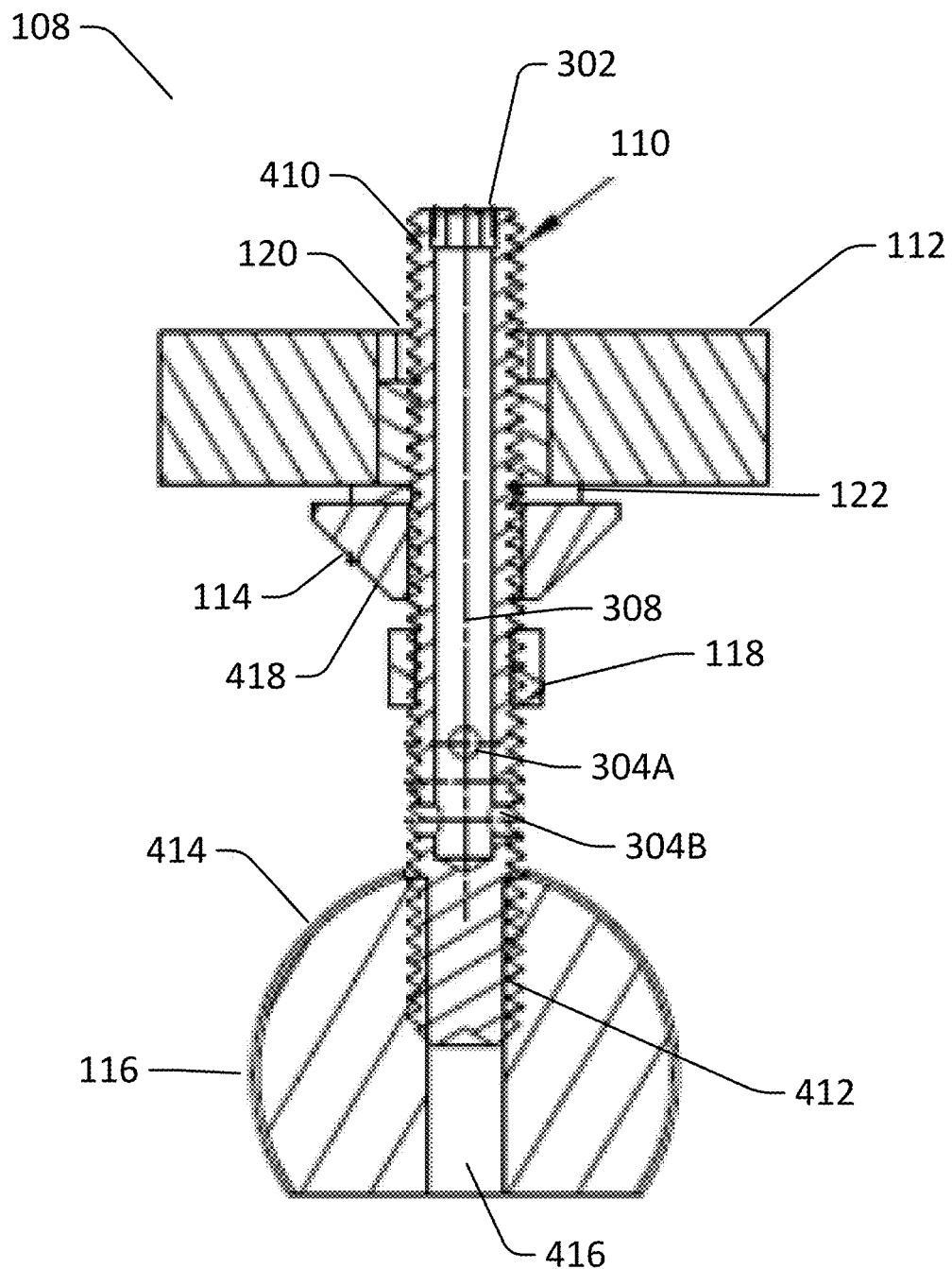
FIG. 4B illustrates a side cutaway view of a boss welding positioning tool in accordance with an example of the disclosure.

FIG. 4B illustrates a side cutaway view of a boss welding positioning tool in accordance with an example of the disclosure. FIG. 4B illustrates purge gas inlet port 302, purge gas outlet ports 304A and 304B, and purge gas flow path 308 of the purge gas delivery connector 110. The purge gas flow path 308 may connect the purge gas inlet port 302 to the purge gas outlet ports 304A and 304B. In the example shown in FIG. 4B, the purge gas outlet ports 304A and 304B may be located at different heights. That is, the purge gas outlet port 304A may be located at a first height and the purge gas outlet port 304B may be located at a second height. As such, the purge gas outlet ports may, for example, be configured to deliver purge gas both above and below an intersection of the boss 104 and the duct 102. Such a configuration may further improve weld quality.

The purge gas delivery connector 110 may additionally include threads 410. Threads 410 may be configured to allow the purge gas delivery connector 110 to thread into the purge base 416 (e.g., thread into female threads 412 of cavity 416 of the purge base 116). Additionally, the threads 410 may be configured to allow, for example, the nut driver 112, the cone portion 114, the stop spacer 118, the flange nut 120, and/or a washer 122 to be threaded onto the purge gas delivery connector 110.

The cone portion 114 may include a tapered and/or cone shaped form 418. The tapered and/or cone shaped form 418 may position and/or aid in positioning the duct 102 relative to the boss 104. Additionally, the tapered and/or cone shaped form 418 may also self-align the boss welding positioning tool 108 relative to the duct 102 and/or the boss 104.

The purge base 116 may include a partially circular form 414 to substantially conform to an inner circumference of a cylindrically shaped duct. The circular form 114 may at least partially substantially conform to an inner circumference of the duct 102. Additionally, the washer 122 may be disposed between, for example, the nut driver 112 and the cone portion 114 to, for example, distribute force from the tightening of the flange nut 120 in an even manner.

Figure 4C:
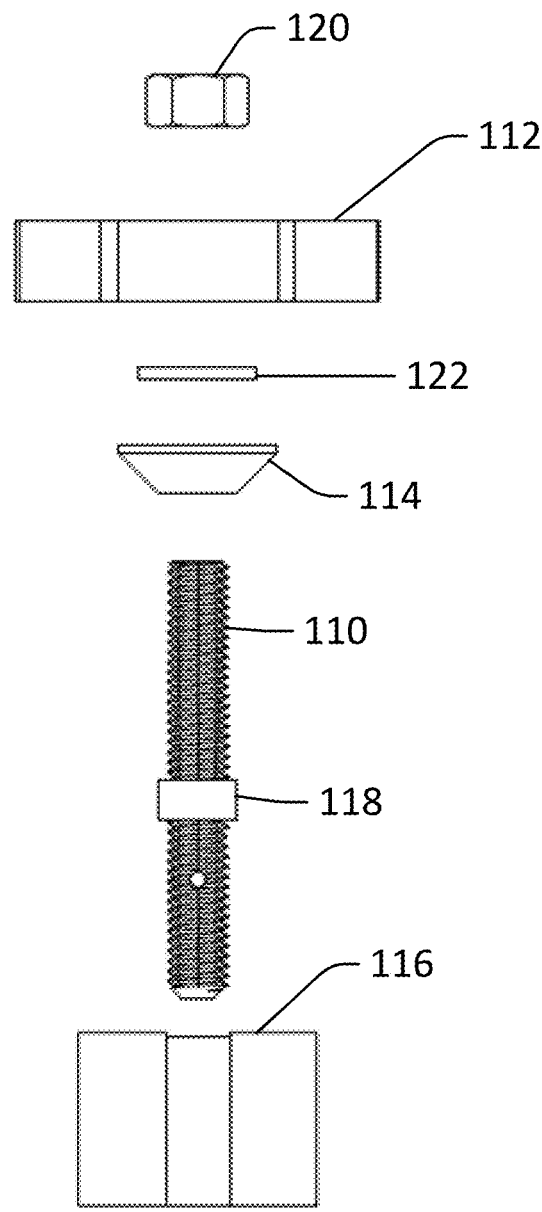
FIG. 4C illustrates an exploded view of a boss welding positioning tool in accordance with an example of the disclosure.

FIG. 4C illustrates an exploded view of a boss welding positioning tool in accordance with an example of the disclosure. FIG. 4C illustrates an exploded view of the boss welding positioning tool 108 with the purge gas delivery connector 110, the nut driver 112, the cone portion 114, the purge base 116, the stop spacer 118, the flange nut 120, and the washer 122.

Figure 5:
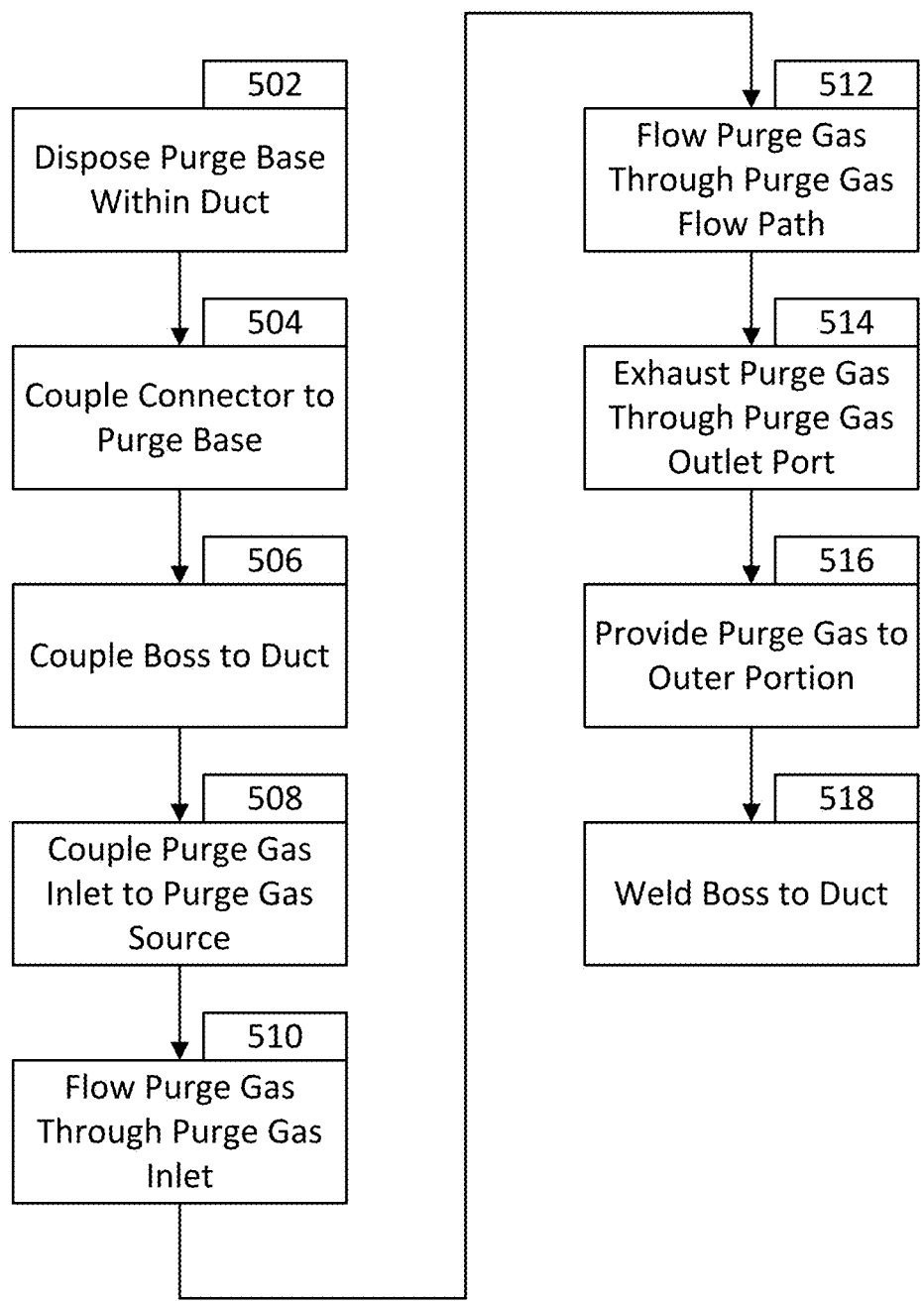
FIG. 5 is a flowchart detailing a processing of welding a duct to a boss with the boss welding positioning tool in accordance with an example of the disclosure.

FIG. 5 is a flowchart detailing a processing of welding a duct to a boss with the boss welding positioning tool in accordance with an example of the disclosure. In block 502, the purge base 116 may be disposed within the duct 102. The purge base 116 may be positioned such that a feature of the purge base 116 may conform to a feature (e.g., the inner circumference) of the duct 102.

In block 504, the purge gas delivery connector 110 may be coupled to the purge base 116 (e.g., by threading a portion of the purge gas delivery connector 110 into the purge base 116). In block 506, the boss 104 may be coupled to the duct 102. The cone portion 114 may then be coupled to the boss 104 to hold and/or position the boss 104 against the duct 102.

In block 508, the purge gas inlet port 302 may be coupled to a purge gas source. The purge gas source may be, for example, a source of purge gas from a weld positioner 200. The weld positioner 200 may also receive portions of the boss welding positioning tool 108 (e.g., the nut driver 112) and hold such portions of the boss welding positioning tool 108 and, thus, the boss 104 and the duct 102, in position for welding.

In block 510, purge gas may be provided to the purge gas inlet port 302. Purge gas may flow through the purge gas flow path 308 in block 512 and exit through the purge gas outlet ports 304A and 304B in block 514. Accordingly, purge gas may be provided to the interior portion of the portion of the duct 102 and the boss 104 that will be welded together.

In block 516, purge gas may be provided to an outside portion of the duct 102 and the boss 104 (e.g., from a port on the welder and/or through another such technique.) In block 518, the duct 102 may be welded to the boss 104. In certain examples, the weld positioner 200 may allow a first portion of the boss 104 and the duct 102 to be welded together, the weld positioning tool 108 (and, thus, the boss 104 and the duct 102) to be rotated in the weld positioner 200, and a second portion of the boss 104 and the duct 102 to be welded. As such, the duct 102 and the boss 104 may be fully welded together without requiring the duct 102 and the boss 104 to be flipped over and, thus, repositioned, which may move the orientation of the duct 102 and the boss 104.

Examples described above illustrate but do not limit the invention. It should also be understood that numerous modifications and variations are possible in accordance with the principles of the present invention. Accordingly, the scope of the invention is defined only by the following claims.

What is claimed is:

1. A boss welding positioning tool for delivering purge gas to an internal portion of an intersection of a boss and a duct for welding the boss to the duct, the tool comprising:
a purge base configured to be disposed within an inner portion of a duct;
a purge gas delivery connector comprising a purge gas inlet port and a purge gas outlet port, and configured to couple to the purge base, receive purge gas with the purge gas inlet port, and exhaust the purge gas through the purge gas outlet port to the internal portion; and
a boss alignment member configured to couple to the purge gas delivery connector to hold at least a portion of the duct and the boss between the boss alignment member and the purge base, wherein the boss alignment member comprises a cone portion comprising a conical end configured to be at least partially disposed within an opening of the duct to position the boss relative to the purge base and/or the duct.

2. The tool of claim 1, wherein the boss alignment member further comprises:
a nut configured to hold the cone portion against the boss; and
a nut driver at least partially disposed between the nut and the cone portion and configured to be coupled to a nut driver receiver of a weld positioning machine.

3. The tool of claim 1, wherein the purge gas delivery connector further comprises a purge gas flow path fluidically connecting the purge gas inlet port and the purge gas outlet port.

4. The tool of claim 3, wherein the purge gas delivery connector comprises a first connector end and a second connector end, the first connector end comprises the purge gas inlet port, the second connector end is configured to couple to the purge base, and the purge gas outlet port is disposed between the first connector end and the second connector end.

5. The tool of claim 4, wherein the purge gas outlet port is configured to be disposed within 0.25 inches of the intersection of the duct and the boss.

6. The tool of claim 1, further comprising a plurality of purge gas outlet ports.

7. The tool of claim 6, wherein at least one of the plurality of purge gas outlet ports is disposed within 0.25 inches above the intersection of the duct and the boss and at least another of the plurality of purge gas outlet ports is disposed within 0.25 inches below the intersection of the duct and the boss.

8. The tool of claim 1, further comprising a stop spacer coupled to the purge gas delivery connector and configured to be disposed within the boss, wherein at least a portion of the stop spacer is configured to be disposed within 0.5 inches of the intersection of the duct and the boss.

9. The tool of claim 1, wherein the purge gas delivery connector is configured to be threaded into the purge base and at least a portion of the boss alignment member is configured to be threaded onto the purge gas delivery connector.

10. The tool of claim 1, wherein the purge base comprises a partially circular form configured to substantially conform to a portion of an inner circumference of the duct.

11. A method of operating the tool of claim 1, the method comprising:
disposing the purge base within the inner portion of the duct;
coupling the purge gas delivery connector into the purge base;
coupling the boss alignment member to the purge gas delivery connector;
coupling the purge gas inlet port to a purge gas source;
flowing the purge gas from the purge gas source into the purge gas inlet to exit through the purge gas outlet port to the inner portion of the duct;
providing the purge gas to an outer portion of the duct; and
welding the boss to the duct.

12. The method of claim 11, wherein coupling the boss alignment member to the purge gas delivery connector comprises positioning the purge gas outlet port within 0.25 inches of an intersection of the duct and the boss.

13. The method of claim 11, wherein the purge gas delivery connector comprises a plurality of purge gas outlet ports.

14. The method of claim 13, wherein at least one of the plurality of purge gas outlet ports is disposed within 0.250 inches above an intersection of the duct and the boss and at least another of the plurality of purge gas outlet ports is disposed within 0.25 inches below the intersection of the duct and the boss.

15. The method of claim 11, wherein coupling the boss alignment member to the purge gas delivery connector comprises:
coupling the cone portion to the purge gas delivery connector to center the boss against the duct by at least partially disposing the conical end of the cone portion within the opening of the duct.

16. The method of claim 11, wherein the boss alignment member further comprises a nut driver and a nut and the method further comprises:
coupling the nut to the purge gas delivery connector to hold the cone portion against the boss; and
coupling the nut driver to a nut driver receiver of a weld positioning machine, wherein the nut driver is at least partially disposed between the nut and the cone portion.

17. The method of claim 16, wherein welding the boss comprises:
welding a first portion of an intersection of the duct and the boss,
repositioning the nut driver receiver, and
welding a second portion of the intersection of the duct and the boss.

18. The method of claim 11, wherein welding the boss to the duct comprises fully welding the boss to the duct.

19. The tool of claim 2, wherein the nut driver is a hexagonal shaped nut driver.

20. The tool of claim 2, wherein the tool is configured to move relative to the weld positioning machine to aid in welding of the duct to the boss.

* * * * *